(12) United States Patent
Sato

(10) Patent No.: US 6,339,272 B1
(45) Date of Patent: Jan. 15, 2002

(54) WASHER PUMP AND MOTOR BRUSH SUPPORT STRUCTURE

(75) Inventor: Toshihiro Sato, Toyohashi (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/471,145

(22) Filed: Dec. 23, 1999

(30) Foreign Application Priority Data

| Dec. 24, 1998 | (JP) | 10-366943 |
| Dec. 24, 1998 | (JP) | 10-366944 |
| Jan. 8, 1999 | (JP) | 11-002811 |
| Jan. 12, 1999 | (JP) | 11-004967 |

(51) Int. Cl.$^7$ .............................................. H02K 5/12
(52) U.S. Cl. ..................................... 310/87; 417/423.3
(58) Field of Search ............................... 310/87, 62, 63, 310/40 MM, 239, 244, 246; 417/360, 363, 423.3

(56) References Cited

U.S. PATENT DOCUMENTS

| 4,260,340 A | * | 4/1981 | Lamaudiere | 417/412 |
| 4,638,203 A | * | 1/1987 | Maki et al. | 310/239 |
| 4,820,139 A | * | 4/1989 | Tuckey | 418/135 |
| 4,873,464 A | * | 10/1989 | Wang | 310/249 |
| 5,013,952 A | * | 5/1991 | Sekine et al. | 310/239 |
| 5,077,503 A | * | 12/1991 | Tamura et al. | 310/88 |
| 5,181,838 A | * | 1/1993 | Sato et al. | 417/360 |
| 5,961,293 A | * | 10/1999 | Clemmons et al. | 417/44.2 |
| 6,043,576 A | * | 3/2000 | Weber et al. | 310/68 B |
| 6,053,708 A | * | 4/2000 | Nishikawa | 417/360 |

FOREIGN PATENT DOCUMENTS

| EP | 0460551 A2 | * | 12/1991 |
| JP | 61-43768 A | | 3/1986 |
| JP | 2-49657 A | | 4/1990 |
| JP | 04129863 A | | 4/1992 |
| JP | 4-111263 A | | 9/1992 |
| JP | 6-52370 A | | 7/1994 |
| JP | 3035467 | | 12/1996 |

* cited by examiner

*Primary Examiner*—Joseph Waks
(74) *Attorney, Agent, or Firm*—Nath & Associates PLLC; Harold L. Novick; Marvin C. Berkowitz

(57) ABSTRACT

A washer pump motor includes a case having a pair of arcuate walls and a pair of flat walls. A pair of brushes are opposed to a commutator. A lid, which forms part of the case, includes a pair of brush supports for respectively supporting the brushes. Each brush support includes a base plate, which is fixed to the lid, and a plate spring, which detachably engages with the base plate. The plate spring has a retained portion retained by the corresponding base plate and a resilient arm portion to which the corresponding brush is fixed. The resilient arm portion extends from the retained portion and is substantially parallel to the flat walls. This maximizes the length of the resilient arm portion and maintains the performance of the motor. Also, this arrangement permits miniaturization of the motor and facilitates assembly.

10 Claims, 12 Drawing Sheets

WASHER PUMP AND MOTOR BRUSH SUPPORT STRUCTURE

BACKGROUND OF THE INVENTION

The present invention relates to a washer pump referable for a washer device that sprays cleaning liquid to the windshield of a vehicle. More specifically, the present invention relates to a motor brush support structure preferable for washer pump.

A typical washer device for vehicles includes a tank for storing cleaning liquid and a washer pump for pumping the cleaning liquid from the tank to a washer nozzle. A washer pump described in Japanese Unexamined Patent Publication 4-4129863 has a housing including a motor chamber and a pump chamber. The motor chamber accommodates a direct current motor. The pump chamber includes an impeller. The motor rotates the impeller, which pumps the cleaning liquid from the tank to the washer nozzle.

Compact and light vehicle washer devices are preferred. To reduce the size and weight of a washer device, it is necessary to reduce the size and weight of the motor since the motor accounts for a large portion of the weight of the washer pump. However, simply reducing the size of the motor reduces the torque and lowers the performance of the washer pump.

To reduce the size and weight of the motor without reducing the torque, a flattened motor is desired. In detail, the cross section of the motor is preferably shaped as if two opposite sides of a circle were cut off. Such motors are described in Japanese Unexamined Patent Publication No. 4-129863, Japanese Unexamined Utility Model Publication No. 61-43768, Japanese Unexamined Utility Model Publication No. 6-52370, and Japanese Unexamined Utility Model Publication No. 4-111263. Each motor described in any one of these publications includes a pair of opposed arcuate portions and a pair of opposed flat portions.

The motor includes an armature and a commutator that are located on the output shaft, a pair of magnets surrounding the armature, a pair of brushes contacting the commutator, and a pair of supports for the brushes. Publication No. 61-43768 and 6-52370 describe a support including a plate spring. The plate spring includes a proximal end supported by the lid of the motor case and a distal end on which the brush is fixed. The resilience of the plate spring presses the brush against the commutator The brush contact pressure to the commutator greatly influences the operational losses of the motor, such as resistance loss and friction loss. Therefore, the brush contact pressure to the commutator must be properly maintained. However, as the brush wears, the force of the plate spring supporting the brush changes, which changes the brush contact pressure.

To minimize the change of force of the plate spring due to wear of the brush, it is necessary to maximize the distance between the fixed end of the plate spring and the brush at the distal end of the plate spring. In other words, it is necessary to maximize the length of the arm portion of the plate spring. The longer the arm portion of the plate spring is, the smaller the change of the plate spring force due to brush wear is. In this way, the initial performance of the motor can be maintained for a relatively long period.

However, in the motor described in the publications 61-43768 and 6-52370, the arm portion of the plate spring is perpendicular to the flat surfaces of the motor. The distance between the opposite flat surfaces is relatively small. Therefore, it is impossible to greatly increase the length of the arm portion of the plate spring. In other words, the size of the motor cannot be reduced by further flattening the motor without reducing the length of the arm portion of the plate spring. Accordingly, the arrangement of the plate spring shown in the publications is an obstacle to reducing the size of the motor.

In the motor described in the publications 61-43768 and 6-52370, a pair of plate springs are fixed to the lid of the motor case. The brushes on the plate springs are arranged to surround the commutator. To install the commutator between the brushes when assembling the motor, a worker must separate the plate springs from one another. This complicates the motor assembly.

In the motor described in the publication 6-52370, the input terminal that is connected to the external output terminal is attached to the lid of the motor case. The support for the brushes is attached to the lid to contact the input terminal. However, the input terminal and the support are independent and are respectively attached to the lid, which not only complicates the motor structure but limits miniaturization of the motor.

SUMMARY OF THE INVENTION

An objective of the present invention is to provide a motor brush support structure that can downsize the motor and maintain the initial performance of the motor for a relatively long period.

Another objective of the present invention is to provide a motor brush support structure that facilitates the motor assembly.

A still further objective of the present invention is to provide a washer pump including such a motor brush support structure.

To achieve the above objectives, the present invention provides a motor brush support structure. The motor includes a case having a detachable lid, an output shaft, and a commutator located on the output shaft. The support structure comprises a brush, a resilient member, a base and an engagement structure. The brush is opposed to the commutator. The resilient member urges the brush toward the commutator such that the brush contacts the commutator. The base is attached to the lid. The base includes a retainer for retaining the resilient member. The engagement structure is located between the resilient member and the retainer such that the resilient member is detachably secured to the retainer.

In a motor brush support structure provided by the another aspect of the present invention, the motor includes a case, an output shaft, and a commutator located on the output shaft. The case has a flat wall located inward of an imaginary circle circumscribing the case. The support structure comprises a brush and a resilient member. The brush is opposed to the commutator. The resilient member urges the brush toward the commutator such that the brush contacts the commutator. The resilient member includes a fixed portion supported by the case and a resilient arm portion to which the brush is fixed. The resilient arm portion extends from the fixed portion such that the resilient arm portion is substantially perpendicular to the output shaft and is substantially parallel to the flat wall.

Also, the present invention provides a pump. The pump comprises a housing, which includes a motor chamber, an impeller, which draws in and pumps out liquid, and a motor, which is accommodated in the motor chamber to drive the impeller. The motor includes a case, which has a flat wall located inward of an imaginary circle circumscribing the case, an output shaft, which is coupled to the impeller, a commutator, which is located on the output shaft, a brush, which is opposed to the commutator, and a resilient member, which urges the brush toward the commutator such that the brush contacts the commutator. The resilient member includes a fixed portion supported by the case and a resilient arm portion to which the brush is fixed. The resilient arm portion extends from the fixed portion such that the resilient arm portion is substantially perpendicular to the output shaft and is substantially parallel to the flat wall.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
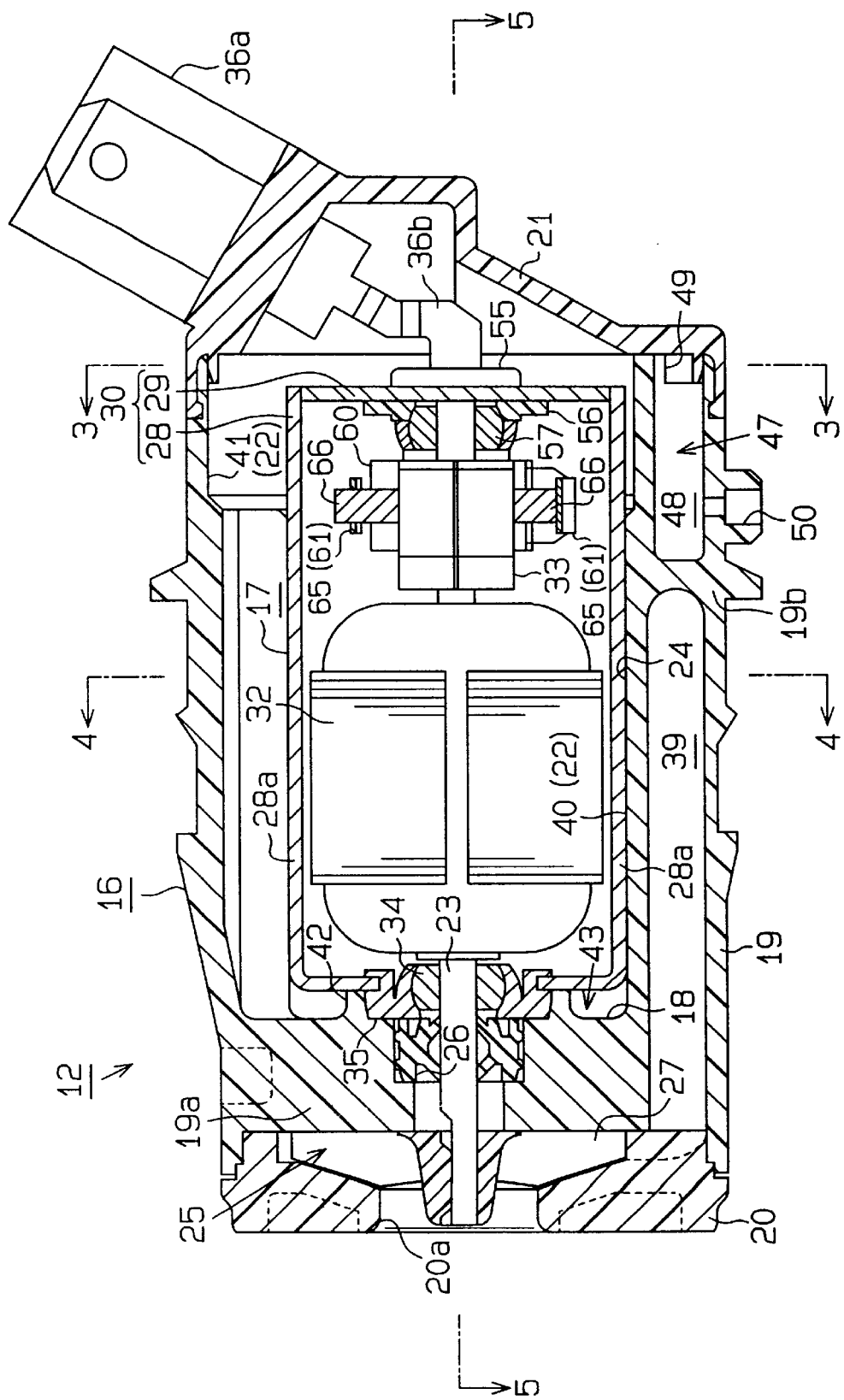
FIG. 1 is a cross sectional view of a washer pump according to one embodiment of the present invention.

One embodiment of the present invention will now be described with reference to FIGS. 1–4. FIG. 2 shows a washer device 10 for vehicles. The washer device 10 includes a tank 11 for storing cleaning liquid and a washer pump 12, which is attached to the tank 11. The washer pump 12 pumps cleaning liquid from the tank 11 to a washer nozzle (not shown).

The tank 11 is a generally rectangular and has a supply port 13 at the top. A vertical side wall 11a, which is recessed, is formed at the lower portion of the tank 11. An installation hole 14 for receiving the washer pump 12 is formed in the vertical side wall 11a. The washer pump 12 fitted in the installation hole 14 with a grommet 15 and the axis of the washer pump 12 extends horizontally. Approximately one half of the washer pump 12 is located in the tank 11 and the other half is located outside the tank 11.

Figure 2:
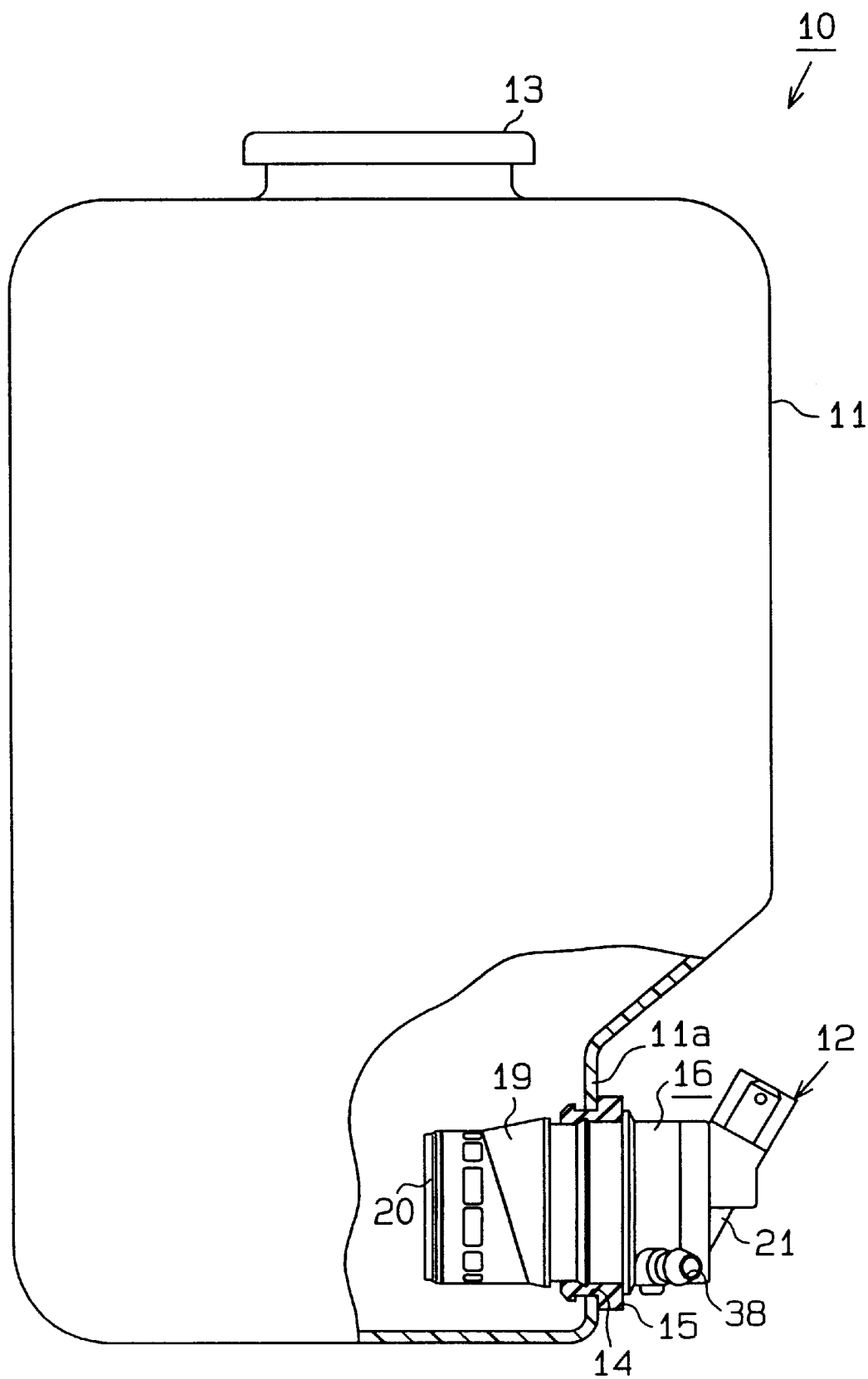
FIG. 2 is a partially cut away view of a washer device including the washer pump of FIG. 1.

As shown in FIG. 1, the washer pump 12 includes a generally cylindrical housing 16, a motor 17 located in the housing 16, and an impeller 27. The housing 16 is, for example, made of fiber-reinforced resin and includes a hollow cylindrical body 19, a pump case 20, and a lid 21. The pump case 20 engages a closed end of the cylindrical body 19 and the lid 21 engages an open end of the body 19. The closed end of the body 19 is located in the tank 11 and the open end of the body 19 is located outside the tank 11.

The lid 21 closes the open end of the body 19 and forms a motor chamber 24 in the body 19. The interior surface of the motor chamber 24, or the internal surface of the body 19 includes an internal circumferential surface 22 and an internal end surface 18. A motor 17, which is a DC motor, is fitted in the motor chamber 24.

A pump chamber 25, which accommodates the impeller 27, is formed between the closed end of the body 19 and the pump case 20. An output shaft 23 of the motor 17 passes through the closed end of the body 19, or through a partition 19a, and extends into the pump chamber 25. The partition 19a is located between the motor chamber 24 and the pump chamber 25. An impeller 27 is fixed to the distal end of the output shaft 23. A seal 26 is located between the output shaft 23 and the partition 19a and seals the motor chamber 24 from the pump chamber 25. An inlet 20a for drawing cleaning liquid from the tank 11 to the pump chamber 25 is located in the central portion of the pump case 20.

Figure 3:
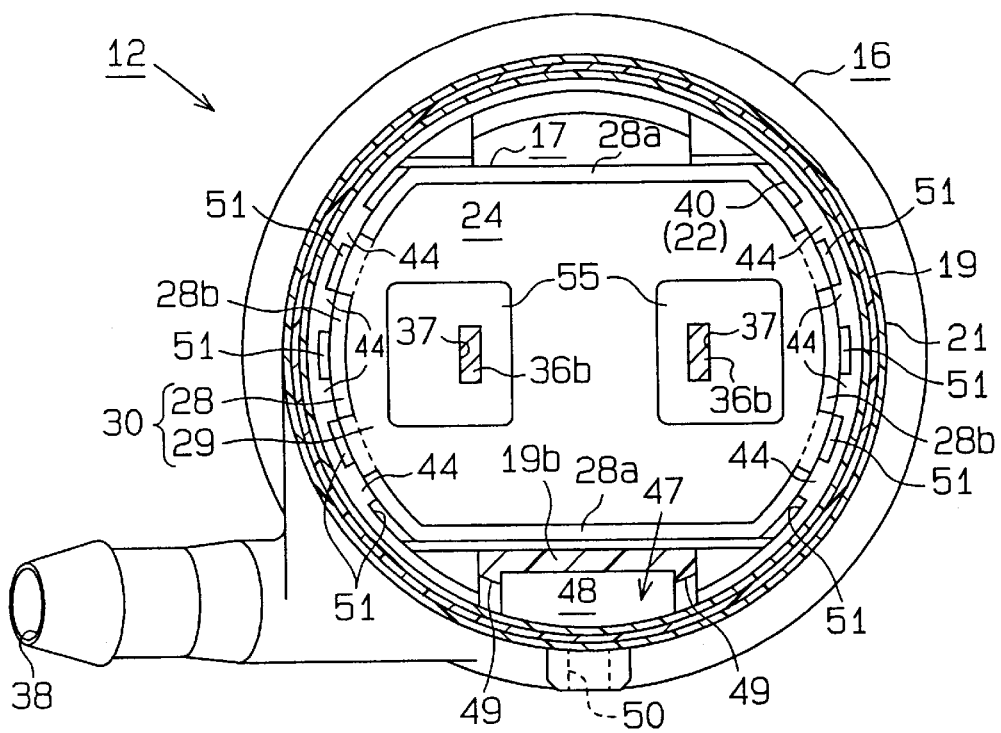
FIG. 3 is a cross sectional view taken along line 3—3 of FIG. 1.
Figure 4:
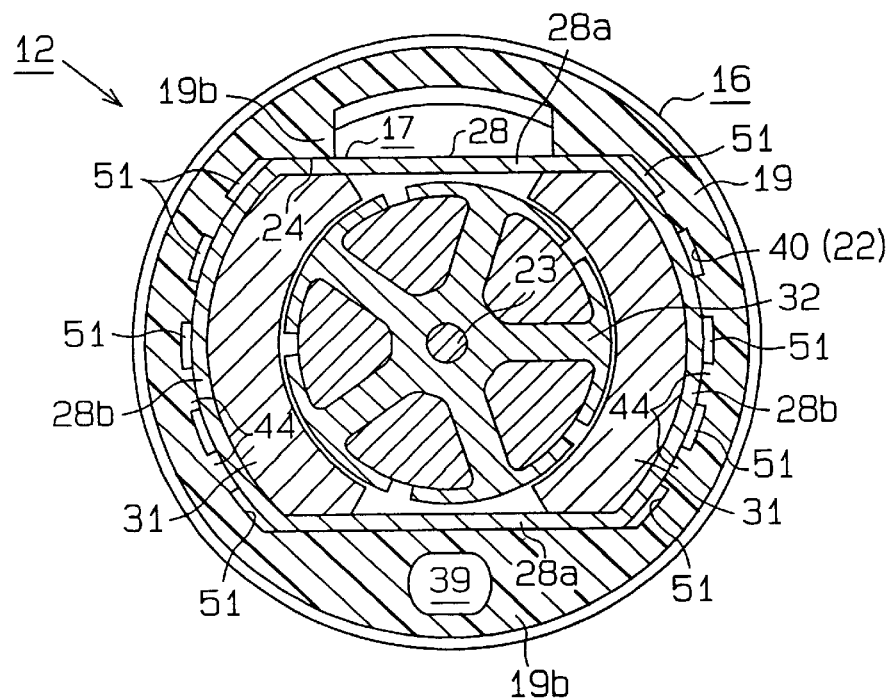
FIG. 4 is a cross sectional view taken along line 4—4 of FIG. 1.

A case for covering the motor 17 includes a tube 28 having an open end and a lid 29 closing the opened end of the tube 28. The tube 28 functions as a yoke. As shown in FIGS. 3 and 4, the tube 28 includes a pair of opposed flat walls 28a and a pair of opposed arcuate walls 28b. In other words, the cross sectional area of the motor 17 is shaped as if two opposite sides of a cylinder have been cut off. That is, the motor 17 has recessed portions (flat walls 28a), which are located inward of an imaginary circle centered on the axis of the motor and having a radius matching the maximum radius of the motor 17.

As shown in FIG. 4, the cross sectional shape of the motor chamber 24 substantially corresponds to the cross sectional shape of the motor 17. The body 19 of the housing 16 has thick portions 19b, which correspond to the flat walls 28a, or the recessed portions, of the motor 17.

A pair of magnets 31 are fixed to the inner surfaces of the arcuate walls 28b in the case 30. The tube 28 magnetically connects the magnets 31. As shown in FIG. 1, an armature 32, which is made of an iron core and a coil, is surrounded by the magnets 31 in the case 30. A commutator 33 is also located in the case 30. The armature 32 and the commutator 33 are attached to the output shaft 23. A bearing 34 is attached to the closed end of the tube 28 through a holder 35. The bearing 34 rotatably supports the output shaft 23.

A connector 36a for supplying electric power is formed on the outer surface of the lid 21 of the housing 16. The connector 36a includes a pair of male terminals 36b, which extend into the housing 16. As shown in FIG. 3, the terminals 36b, which serve as output terminals, are respectively received in a pair of connection ports 37, which are formed in the lid 29 of the motor 17.

As shown in FIGS. 2 and 3, the housing 16 includes an outlet 38 for discharging cleaning liquid. As shown in FIGS. 1 and 4, the housing 16 also includes a discharge passage 39 for connecting the pump chamber 25 to the outlet 38. The discharge passage 39 extends in the axial direction of the motor 17 in the body 19 of the housing 16, or in the lower thick portion 19b. At least part of the discharge passage 39 is located inward of the imaginary circle mentioned previously, as seen in FIG. 4.

As shown in FIG. 1, the internal circumferential surface 22 of the body 19 includes a fitting surface 40 and a large diameter surface 41. The large diameter surface 41, the diameter of which is greater than that of the fitting surface 40, is located in the vicinity of the open end of the body 19. An annular projection 42 is formed on the end surface 18 of the body 19. The projection 42 engages the holder 35. An annular front space 43 is formed between the inner surface of the body 19 and the outer surface of the motor 17.

As shown in FIGS. 3 and 4, projections 44, which extend in the axial direction of the motor 17, are formed on the fitting surface 40 at equal angular intervals to face the arcuate walls 28b of the motor 17. The projections 44 contact the arcuate walls 28b. The projections 44 define longitudinal passages 51 between the fitting surface 40 and the arcuate walls 28b. The longitudinal passages 51 extend in the axial direction of the motor 17. The longitudinal passages 51 between the motor 17 and the housing 16 connect the front space 43 of the motor chamber 24 to a rear space (corresponding to the large diameter surface 41) of the motor chamber 24.

As shown in FIGS. 1 and 3, a drain structure 47, which connects the motor chamber 24 to the exterior of the housing 16, is formed in the housing 16. The drain structure 47 leads water in the motor chamber 24 to the exterior of the housing 16 to prevent water from remaining in the motor chamber 24. The drain structure 47 is located at the lowest part of the motor chamber 24.

The drain structure 47 includes a first, or main, passage 48, a pair of second, or inlet, passages 49, and a third, or outlet, passage 50. The parts of the drain structure 47 respectively extend in different directions. The first, or main, passage 48 is formed in the lower thick portion 19b of the body 19 and extends in an axial direction of the housing 16. The second, or inlet, passages 49 extend along the circumference of the housing 16 and connect the motor chamber 24 to one end of the main passage 48. The third, or outlet, passage 50 extends radially and connects an inner end of the main passage 48 to the exterior of the housing 16.

At least one part of the drain structure 47 is located inward of the imaginary circle that circumscribes the motor 17. As shown in FIG. 3, part of the main passage 48 is located inward of the imaginary circle that circumscribes the motor 17.

When the motor 17 rotates the impeller 27, cleaning liquid in the tank 11 is drawn to the pump chamber 25 through the inlet 20a. Then cleaning liquid in the pump chamber 25 is sent to the washer nozzle (not shown) through the discharge passage 39 and the outlet 38.

Figure 5:
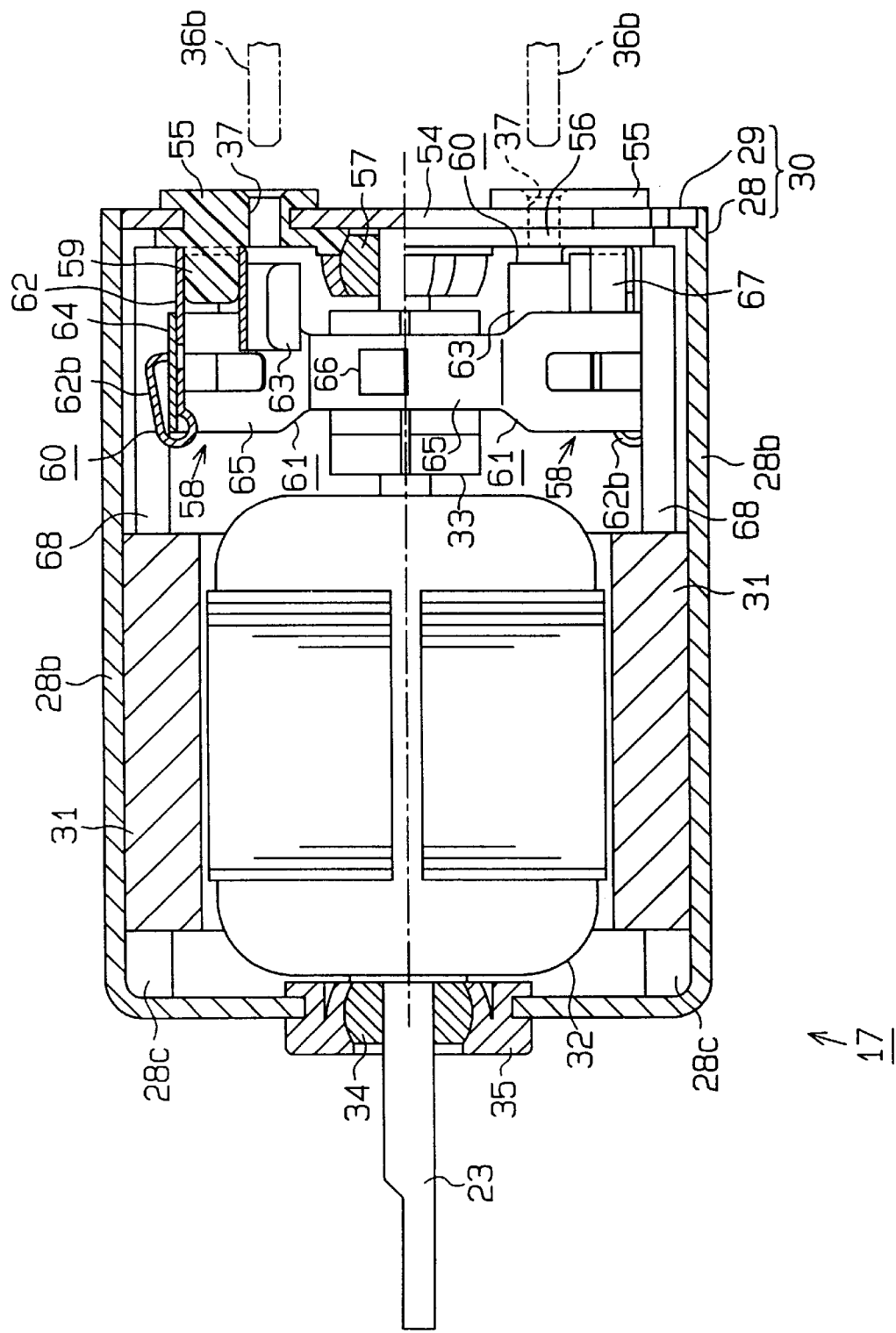
FIG. 5 is a cross sectional view of the motor taken along line 5—5 of FIG. 1.
Figure 6:
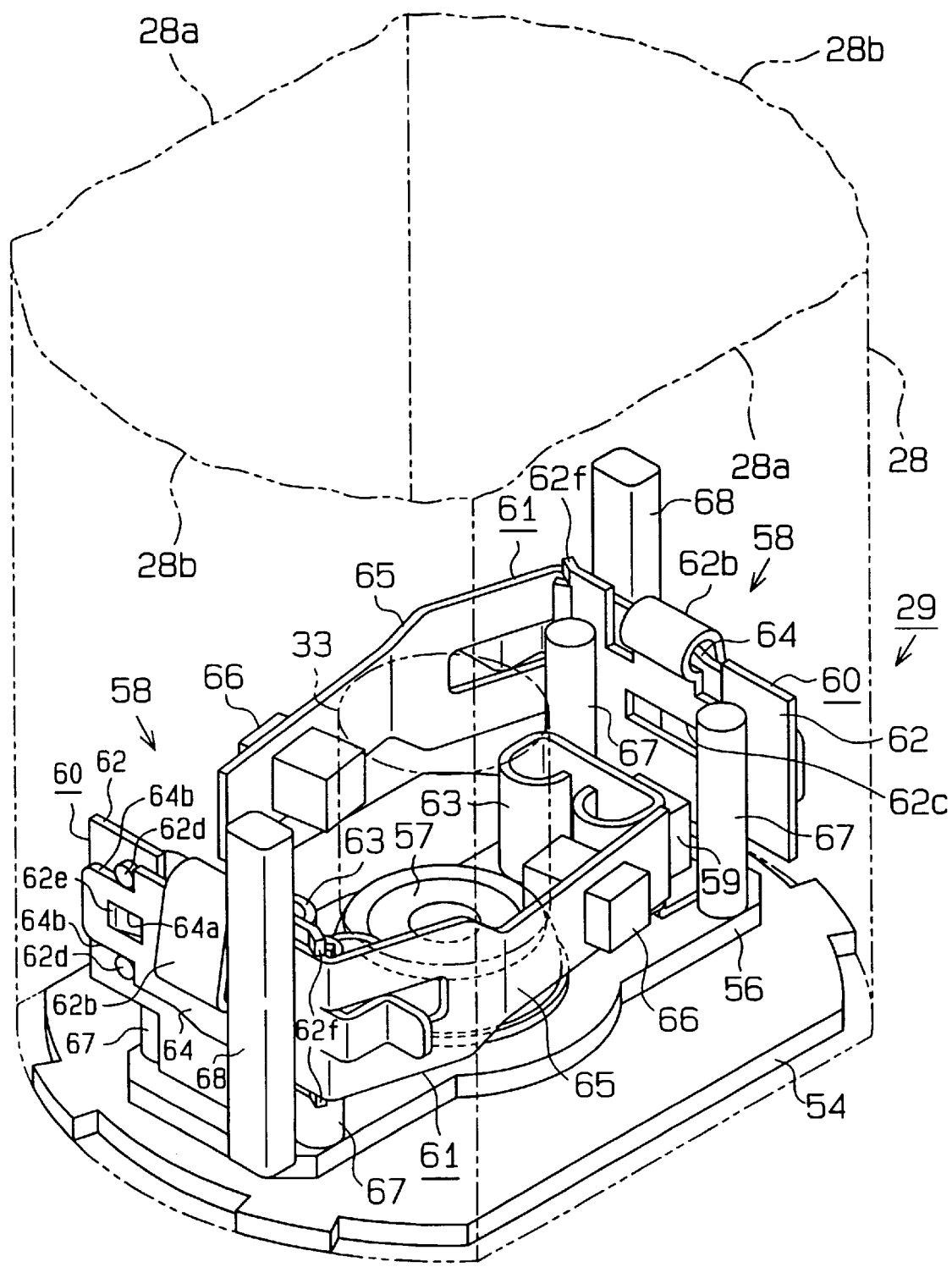
FIG. 6 is a perspective view showing the brush support structure on the lid of the motor of FIG. 5.

The structure of the motor 17 will now be described. As shown in FIGS. 5 and 6, the lid 29 serves as a support for the brush support structure and includes a metal main plate 54, which is shaped to correspond to the open end of the tube 28. A resin insulator 56 is attached to the main plate 54. The main plate 54 is formed, for example, by press punching a metal plate. The insulator 56 is integrally formed with the main plate 54, for example, by outserting.

As shown in FIGS. 3 and 5, part of the insulator 56 that is exposed to the outer surface of the main plate 54 forms a pair of connectors 55. Connection ports 37 are respectively formed in the connectors 55. The ports 37 pass through the insulator 56. As shown in FIGS. 5 and 6, the insulator 56 also includes a pair of projections 59, which are formed on the inner surface of the main plate 54.

The bearing 57 is attached to the central portion of the inner surface of the main plate 54. In FIGS. 5 and 6, the bearing 57 is a plain bearing but may be a ball-and-roller bearing. The proximal end of the output shaft 23 is rotatably supported by the bearing 57, and the output shaft 23 contacts the main plate 54. Accordingly, the output shaft 23 is electrically connected to the main plate 54.

Figure 7:
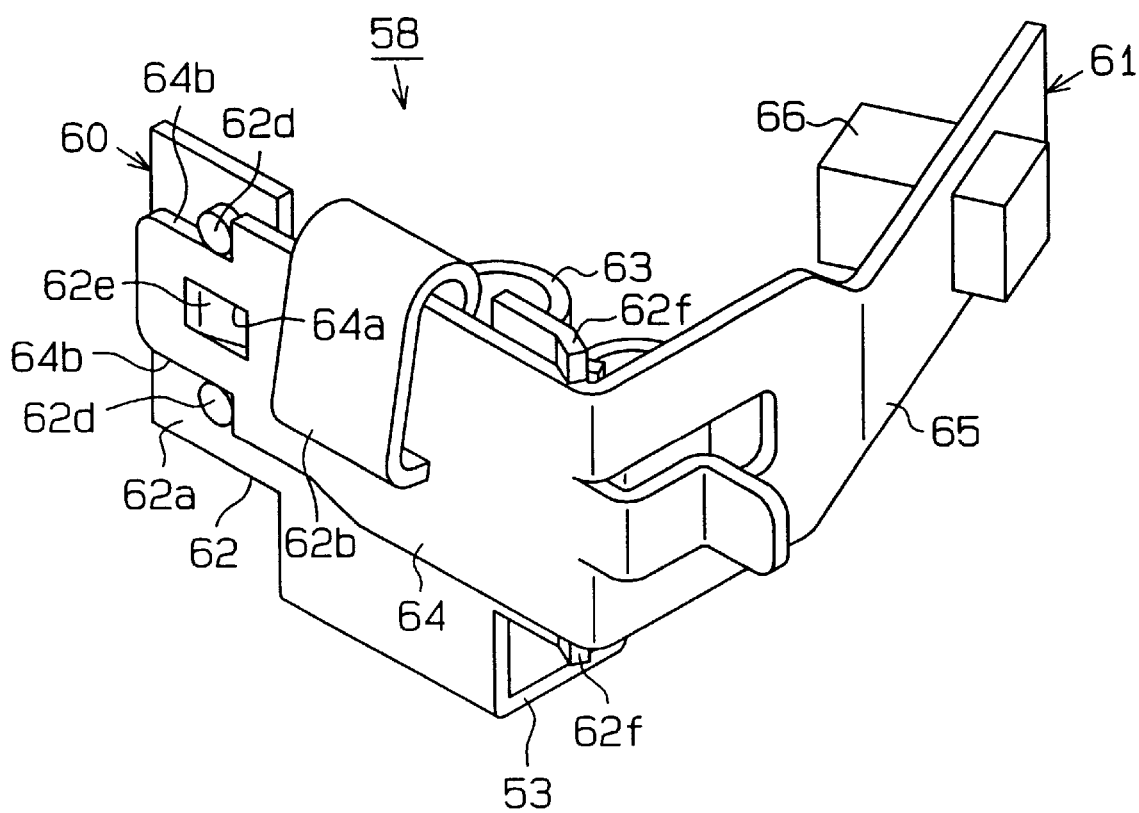
FIG. 7 is an enlarged perspective view showing the brush support of FIG. 6.

As shown in FIGS. 5 and 6, a pair of brush supports 58 are attached to the insulator 56 at opposite sides of the bearing 57. The brush supports 58 are arranged to surround the commutator 33, which is located on the output shaft 23, and are symmetrical with respect to the axis of the output shaft 23. FIG. 7 shows one of the brush supports 58. Each brush support 58 includes a base plate 60, which is crimped to a corresponding one of the projections 59, and a plate spring 61, which is detachably supported by the base plate 60.

Figure 8:
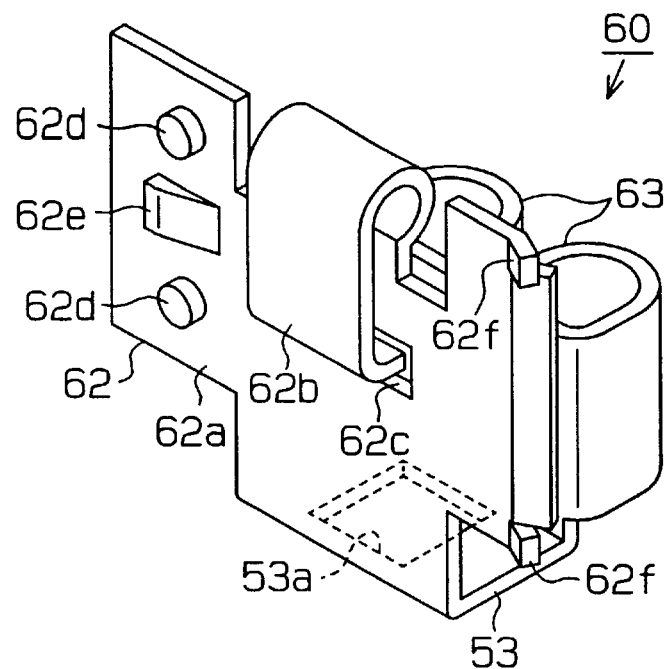
FIG. 8 is a perspective view showing a base plate forming a portion of the brush support of FIG. 7.

As shown in FIG. 8, the base plate 60 is formed by bending a resilient metal plate. The base plate 60 includes an attachment portion 53 fixed to the insulator 56, a retainer 62 for retaining the plate spring 61, and a female terminal 63 that serves as an input terminal. The retainer 62 and the female terminal 63 are formed by bending sides of the attachment portion at right angles.

The attachment portion 53 includes an engagement hole 53a, which engages the projection 59. The projection 59, when engaged with the engagement hole 53a, is held between the retainer 62 and the female terminal 63 (See FIG. 5). The retainer 62 has a planar retaining surface 62a, which is on the opposite side of retainer 62 from the female terminal 63. A clamping arm 62b is curved from the top of the retainer 62, toward the retaining surface 62a. The plate spring 61 is held between the retaining surface 62a and the clamping arm 62b by the spring force of the clamping arm 62b (See FIG. 7). When the plate spring 61 is detached from the base plate 60, the distal end of the clamping arm 62b enters a slot 62c in the retaining surface 62a.

Upper and lower columnar engagement projections 62d are formed on the retaining surface 62a adjacent to the clamping arm 62b. A wedge-shaped engagement claw 62e is formed on the retaining surface 62a and is located between the engagement projections 62d. The engagement claw 62e has an inclined surface that is lower toward the clamping arm 62b. Upper and lower engagement pieces 62f are formed by bending part of the retainer 62 and are located on the opposite side of the clamping arm 62b from the engagement projections 62d.

As shown in FIGS. 5 and 6, when the lid 29 is attached to the tube 28, each female terminal 63 of the base plates 60 is aligned with the corresponding connection port 37. Also, each female terminal 63 is located inward of the retainer 62 in the radial direction of the output shaft 23. In other words, each female terminal is located between the retainer 62 and the commutator 33 in a radial direction of the output shaft 23 that is parallel to the flat walls 28a. When the male terminals 36b are received in the connection ports 37, the female terminals 63 resiliently hold the male terminals 36b.

When the lid 29 is attached to the tube 28, each retainer 62 of the base plates 60 is located near the corresponding arcuate walls 28b of the tube 28. In other words, the retainer is arranged to correspond to the largest diameter portion of the motor 17.

As shown in FIGS. 5 and 6, limit columns 67 are formed at the corners of the insulator 56. The limit columns 67 are parallel to the axis of the motor 17, or the axis of the output shaft 23. Each retainer 62 is supported by the corresponding limit column 67 from the inside. The two limit columns 67 support the corresponding retainers 62 such that each retainer 62 is parallel to the axis of the output shaft 23 and perpendicular to the flat walls 28a of the tube 28.

Figure 9:
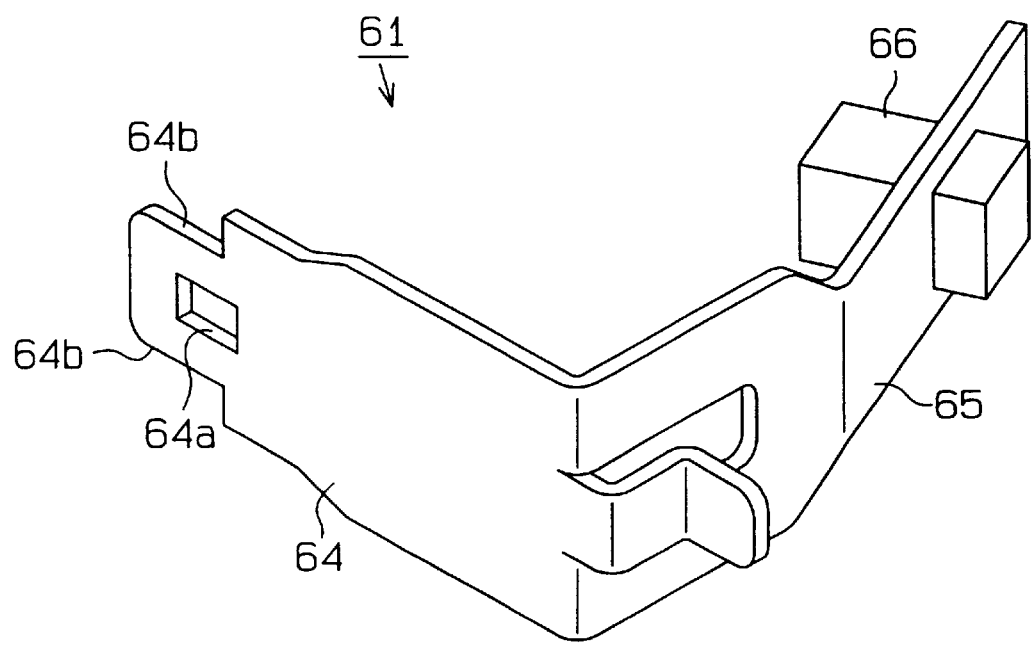
FIG. 9 is a perspective view showing a plate spring forming a portion of the brush support of FIG. 7.

The brush supports 58 are essentially the same, so the following describes only one brush support 58 for simplicity. As shown in FIG. 9, the plate spring 61 is formed by bending a resilient metal plate near its middle at a right angle. The plate spring 61 includes a retained portion 64 retained by the retainer 62 of the base plate 60 and an arm portion 65 extending from one end of the retained portion 64. The retained portion 64 is from the proximal end to the middle of the plate spring 61. The arm portion 65 is from the middle to the distal end of the plate spring 61.

The proximal end of the plate spring 61 includes an engagement hole 64a. The proximal end of the retained portion 64 also includes a pair of notches 64b, which are formed on opposite sides of the engagement hole 64a. A brush 66 is fixed to the distal end of the plate spring 61, or the distal end of the arm portion 65.

As shown in FIG. 7, when the plate spring 61 is attached to the base plate 60, the retained portion 64 is held between the retaining surface 62a and the clamping arm 62b. In this state, the engagement claw 62e on the retaining surface 62a engages the engagement hole 64a of the retained portion 64. Also, the engagement projections 62d engage the internal corners of the notches 64b. Further, the engagement pieces 62f of the retainer 62 engage the sides of the retained portion 64. As a result, the retained portion 64 of the plate spring 61 is fixed to the base plate 60. The clamping arm 62b, the engagement claw 62e, the engagement projections 62d, and the engagement pieces 62f constitute an engagement structure, or a positioning structure, which fixes the retained portion 64 to the base plate 60.

As shown in FIGS. 5 and 6, two positioning pillars 68 are formed on opposite sides of the insulator 56 and correspond to the brush supports 58. The positioning pillars 68 are parallel to the axis of the motor 17, or the axis of the output shaft 23. Each retained portion 64 of the plate spring 61 is supported by the corresponding positioning pillar 68 from the outside.

Each positioning pillar 68 also positions the corresponding magnet 31 in the case 30 in the axial direction of the motor 17. That is, when the lid 29 is attached to the tube 28 as shown in FIG. 5, the distal end of each positioning pillar 68 contacts one end of the corresponding magnet 31. On the other hand, the other end of each magnet 31 contacts a positioning projection 28c (FIG. 5), which is formed near the closed end of the tube 28. Accordingly, each magnet 31 is axially positioned between the positioning pillar 68 and the positioning projection 28c. Further, the magnets 31 are prevented from moving in the radial direction of the motor 17 by a stopper (not shown).

As already described, when the lid 29 is attached to the tube 28, the base plates 60 are respectively located near the arcuate walls 28b of the tube 28. Accordingly, as shown in FIGS. 5 and 6, the retained portions 64 of the plate spring 61 are also located near the arcuate walls 28b, or at the positions corresponding to the largest diameter portions of the motor 17. Each retained portion 64 is also retained by the corresponding retainer 62 such that the retained portion 64 is parallel to the axis of the output shaft 23 and perpendicular to the flat walls 28a.

As shown in FIGS. 1, 5, and 6, the arm portions 65 extend perpendicular to the axis of the output shaft 23 at a position corresponding to the flat walls 28a, or at positions corresponding to the recessed portions of the motor 17. Each arm portion 65 presses the corresponding brush 66 to the outer surface of the commutator 33 with a predetermined force. When one of the brushes 66 contacts the commutator 33, the corresponding arm portion 65 is generally parallel to the flat walls 28a and urges the brush 66 in a direction perpendicular to the flat walls 28a.

Next, the assembly method of the motor 17 will be described. First, the proximal end of the output shaft 23 is received in the bearing 57 of the lid 29. The base plates 60 are fixed to the lid 29 in advance. The armature 32 and the commutator 33 are located on the output shaft 23.

Next, the plate springs 61 are respectively attached to the corresponding base plates 60. In detail, each retained portion 64 of the plate springs 61 is located between the corresponding engagement pieces 62f and is held between the retaining surface 62a and the clamping arm 62b. In this state, each retained portion 64 is moved along the corresponding retaining surface 62a such that it enters between the engagement projections 62d. As a result, the engaged projections 62d engage the correspond notches 64b, and the engagement claw 62e engages the engagement hole 64a. Accordingly, each retained portion 64 is fixed to the corresponding base plate 60.

In the process of attaching each plate spring 61 to the corresponding base plate 60, the corresponding brush 66 is gradually brought closer to and then contacts the peripheral surface of the commutator 33. Then, the corresponding brush 66 is pressed against the commutator 33 by the predetermined force of the resiliently deformed arm portion 65.

Subsequently, the lid 29 is attached to the tube 28 such that the armature 32 is accommodated in the tube 28. The magnets 31 are attached to the inner surfaces of the arcuate walls 28b of the tube 28 in advance. When the lid 29 is attached to the tube 28, the magnets 31 are positioned in the axial direction of the motor 17 by the positioning pillars 68 and the positioning projections 28c. As a result, the magnets 31 are properly positioned to face the armature 32.

The brushes 66 of the assembled motor 17 wear due to friction between the brushes 66 and the commutator 33 after long use. As the brushes 66 wear, the amount of displacement of the arm portions 65 is gradually reduced, therefore the corresponding urging forces are gradually reduced. If the force of each arm portion 65 is reduced to the extent that contact between the brushes 66 and the commutator 33 cannot be maintained, the plate springs 61, including the brushes 66, can be replaced.

Replacing the plate springs 61 is performed as follows. First the lid 29 is removed from the tube 28. At the same time, the output shaft having the armature 32 and the commutator 33 is removed with the lid 29 from the tube 28. Next, the plate springs 61 are detached from the base plates 60. Then, new plate springs 61 are attached to the base plates 60 and the lid 29 is attached to the tube 28.

The illustrated embodiment has the following advantages.

Each arm portion 65 of the plate springs 61 is substantially parallel to the flat walls 28a of the tube 28. Also, the proximal end of each plate spring 61, or the fixed end of each arm portion 65, is located radially inward of a corresponding one of the arcuate walls 28b of the tube 28. Accordingly, the length of each arm portion 65, or the distance from the fixed end of the arm portion 65 to the brush 66, is maximized in the limited internal space of the tube 28.

The greater the length of each arm portion 65 is, the smaller the loss of urging force of the arm portion 65 due to friction wear of the brush 66 is. Accordingly, since the length of the arm portion 65 is maximized in the present embodiment, the force that presses each brush 66 against the commutator is stable for a long period. Therefore, the initial performance of the motor 17 can be maintained for a long period.

Since the arm portion 65 is generally parallel to the flat walls 28a, the distance between the flat walls 28a is determined regardless of the length of the arm portion 65. Therefore, the motor 17 can be flattened without reducing the length of the arm portions 65. Accordingly, the size and weight of the motor 17 are reduced without reducing motor torque and the life of the brushes 66. By employing the motor 17 in the washer pump 12, the size and weight of the washer pump 12 can be reduced without reducing the displacement of the washer pump 12 and without shortening the live of parts.

The retainer 62 of the base plate 60 is generally perpendicular to the flat walls 28a. The female terminals 63 are located between the corresponding retainers 62 and the commutator 33 in the radial direction of the output shaft 23 that is parallel to the flat walls 28a. In other words, the retainers 62 are aligned with the female terminals 63 in the radial direction of the motor 17 parallel to the flat walls 28a. In this arrangement, the female terminals 63 are located on the lid 29 without limiting the flattening of the motor 17. Further, the retainers 62 are close to the female terminals 63, which permits miniaturization of the brush support structure. Also, since the female terminals 63 are integrally formed with the base plates 60, the structure is simple and the number of parts is reduced.

In the prior art, the plate springs have to be spread manually to arrange the commutator between the brushes when installing the output shaft, which carries the armature and the commutator, to the lid, which carries the plate springs. However, in the present invention, the output shaft 23, which carries the armature 32 and the commutator 33, is attached to the lid 29 before the plate springs 61 are attached to the base plates 60 on the lid 29. This eliminates the troublesome step of manually spreading the plate springs, which facilitates the assembly of the motor 17.

When replacing the plate springs 61, it is not necessary to remove the output shaft, which carries the armature 32 and the commutator 33, from the lid 29. This facilitates replacing the plate springs 61.

The clamping arms 62b, the engagement claws 62e, the engagement projections 62d, and the engagement pieces 62f are integrally formed on the corresponding base plates 60. Accordingly, to attach the detachable plate springs 61 to the base plates 60, there is no need for other independent parts. Therefore, the number of parts forming the brush supports 58 is minimized to two. This facilitates attaching the plate springs 61 to the base plates 60.

The plate springs 61 are attached to the base plates 60 by moving the plate springs 61 such that the brushes 66 approach the commutator 33. In other words, the direction in which the plate springs 61 are moved when attaching them to the base plates 60 is the same as the direction in which the brushes 66 are pressed against the commutator 33 by the plate springs 61. This prevents excessive forces from being applied to the brushes 66 when attaching the plate springs 61 to the base plates 60, which further facilitates attaching the plate springs 61 to the base plates 60.

The insulator 56 supporting the insulated base plates 60 also supports the bearing 57 for the output shaft 23. Therefore, the number of parts is reduced and the structure is simplified.

The lid 29 includes the positioning pillars 68 for positioning and retaining the magnets 31 in the motor 17. Therefore, the magnets 31 are retained at the right position with respect to the armature 32 when the lid 29 is attached to the tube 28.

The main plate 54 of the lid 29 is a metal plate. When the lid 29 is attached to the tube 28 serving as a yoke, the main plate 54 is electrically connected to the tube 28. Accordingly, the case 30, which is formed by the tube 28 and the lid 29, electromagnetically shields the internal magnetic circuit of the motor 17. This prevents electromagnetic noise from leaking from the motor 17. Since the output shaft 23 is electrically connected to the main plate 54, leakage of electromagnetic noise from the output shaft 23 is also prevented.

The discharge passage 39 is formed in the lower thick portion 19b such that at least part of the discharge passage 39 is inward of the imaginary circle circumscribing the motor 17. In other words, the discharge passage 39 is arranged to correspond to the lower flat wall 28a of the motor 17. Therefore, the internal space of the washer pump 12 is efficiently used, which makes the washer pump compact. In other words, the displacement of the pump 12 is increased by increasing the cross-sectional area of the discharge passage 39 without increasing the size of the pump 12. Since the motor 17 is flattened as much as possible, the cross-sectional area of the discharge passage 39 is easily increased.

The front space 43 of the motor chamber 24 is connected to the rear surface of the motor chamber 24 through the longitudinal passage 51. The rear space of the motor chamber 24 is connected to the exterior of the housing 16 through the drain structure 47. Accordingly, the motor chamber 24 is always open to the atmosphere. This prevents cleaning water from being drawn from the tank 11 into the motor chamber 24 through the pump chamber 25 due to pressure changes in the motor chamber 24. Therefore, malfunctions of the motor 17 due to water leakage are prevented.

Even if cleaning liquid enters the front space 43 of the motor chamber 24 from the pump chamber 25, the cleaning liquid flows to the rear space of the motor chamber 24 through the longitudinal passages 51. Water from condensation in the front space of the motor chamber 24 is also led to the rear space of the motor chamber 24 through the longitudinal passages 51. Cleaning liquid and condensation water are drained from the rear space of the motor chamber 24 to the exterior of the housing 16 through the drain structure 47. Accordingly, cleaning liquid and condensation water cannot remain in the internal space of the washer pump 12.

The drain structure 47, which is open to the exterior of the housing 16, includes the main, inlet, and outlet passages 48, 49, 50, which respectively extend in different directions. Accordingly, if the washer pump 12 is splashed by water, water does not reach the motor chamber 24 and the internal space of the motor 17.

Most of the drain structure 47 is formed in the lower thick portion 19b of the body 19 such that at least part of the drain structure 47 is inward of the imaginary circle circumscribing the motor 17. In other words, the drain structure 47 is located to correspond to the lower flat wall 28a of the motor 17. Therefore, the internal space of the washer pump 12 is effectively used, which makes the pump 12 compact.

The embodiment shown by FIGS. 1–9 can be varied as follows.

The female terminals 63 may be located on a radially outer side of the retainers 62 of the base plates 60.

The female terminals 63 (input terminals) may be independent from the base plates 60. In this case, the input terminals are connected to the plate springs 61 by special connectors such as lead wires or patterned wiring. Also, such input terminals may be located to be exposed to the exterior of the lid 29. The input terminals may be soldered to the output terminals 36b. In this case, there is no need for any space for the input terminals inside the lid 29. Therefore, the retained portions 64 of the plate springs 61 can extend in a direction that is not perpendicular to the flat walls 28a.

The output terminals 36b may be female terminals and the input terminals 63 may be male terminals.

The closed end of the tube 28 may be a detachable lid. In this case, the brush support structure may be located in the lid on the distal side of the output shaft 23 instead of the lid 29 on the proximal side of the output shaft 23.

In any one of the two brush supports 58, the base plate 60 and the plate spring 61 may be integrally formed.

The plate springs 61 may be supported by objects that are integrally formed on the insulator 56 instead of the base plates 60.

The brush support structure may be supported by a special support member that is fixed to the case 30 of the motor 17, instead of the lid 29.

The engagement structure for detachably engaging the plate springs 61 with the base plates 60 is not limited to the structure shown in FIG. 6. The plate springs 61 may be engaged with the base plates 60 only by the clamping arms 62b of the base plates 60. Also, the clamping arms 62b for holding the base plates 60 may be formed on the plate springs 61. Further, the engagement structure may be independent from the plate springs 61 or the base plates 60.

The four positioning pillars 68 may be located at the four corners of the insulator 56.

The housing 16 need not include the body 19, the pump case 20, and the lid 21. For example, the housing 16 may be formed by two housing members, which are divided along an axial plane. The housing 16 may also be formed by more than two members.

The directions in which the drain structure 47 extends are not limited to the radial, axial, and circumferential directions of the housing 16. The drain structure 47 may branch in any direction.

The drain structure 47 may have any shape as long as it is not a single straight passage and at least part of it bends. That is, the drain structure 47 should bend to extend in two directions. For example, the main passage 48 may be omitted and the inlet passages 49 may be directly connected to the outlet passage 50. The main passage 48 may be a curved passage instead of a straight passage. Further, the shape of the drain structure 47 may be arcuate.

The main passage 48 may extend below the front space 43 of the motor chamber 24 and the front space 43 may be directly connected to the main passage 48.

In addition to the drain structure 47 shown in FIG. 1, another air passage for connecting the motor chamber 24 to the exterior of the housing 16 may be provided. In this case, air is drawn to the motor chamber 24 through the other air passage as water is drained from the drain structure 47. This facilitates water drainage from the motor chamber 24. The air passage is preferably formed by a plurality of passages that extend at least in two directions.

In addition to or instead of the longitudinal passages 51 shown in FIGS. 3 and 4, another passage for connecting the front space 43 of the motor chamber 24 to the rear space of the motor chamber 24 may be formed in an appropriate portion of the body 19.

The motor 17 does not have to include flat walls 28a but may be cylindrical.

The tube 28, which is a yoke, does not have to serve as a case for the motor 17, and another case may cover the motor 17.

Another embodiment of the present invention will now be described. The embodiment shown in FIGS. 10(a) and 10(b) relates to the structure of the housing 16 for accommodating the motor 17. Members similar to those of the embodiment shown in FIGS. 1–9 have the same numerals, and the description will concentrate on the differences from the embodiment shown in FIGS. 1–9.

Figure 10A:
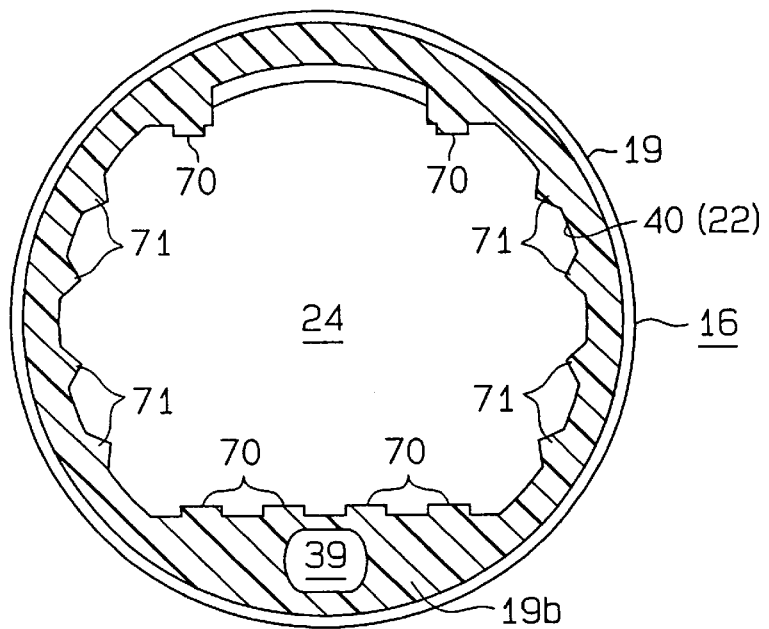
FIG. 10(a) is a cross sectional view corresponding to FIG. 4 showing a housing before installation of a motor in another embodiment of the present invention.

FIG. 10(a) is a cross-sectional view of the body 19 of the housing 16 before the motor 17 is installed. As shown in FIG. 10(a), a plurality of first projections 70 extend in the axial direction of the body 19 to correspond to the flat walls 28a of the motor 17. The distal ends of the first projections 70 are flat and are not easily deformed. The projections 70 may be formed either integrally with the body 19 or independently from the body 19.

Second projections 71 shown in FIG. 10(a) correspond to the projections 44 shown in FIG. 4. The second projections 71 extend in the axial direction of the body 19 on the fitting surface 40 to correspond to the arcuate walls 28b of the motor 17. Each of the second projections 71 has a triangular cross section and is easily deformed. The second projections 71 may be formed either integrally with the body 19 or independently from the body 19. When formed independently from the body 19, the second projections 71 may be made of elastic material such as rubber.

Figure 10B:
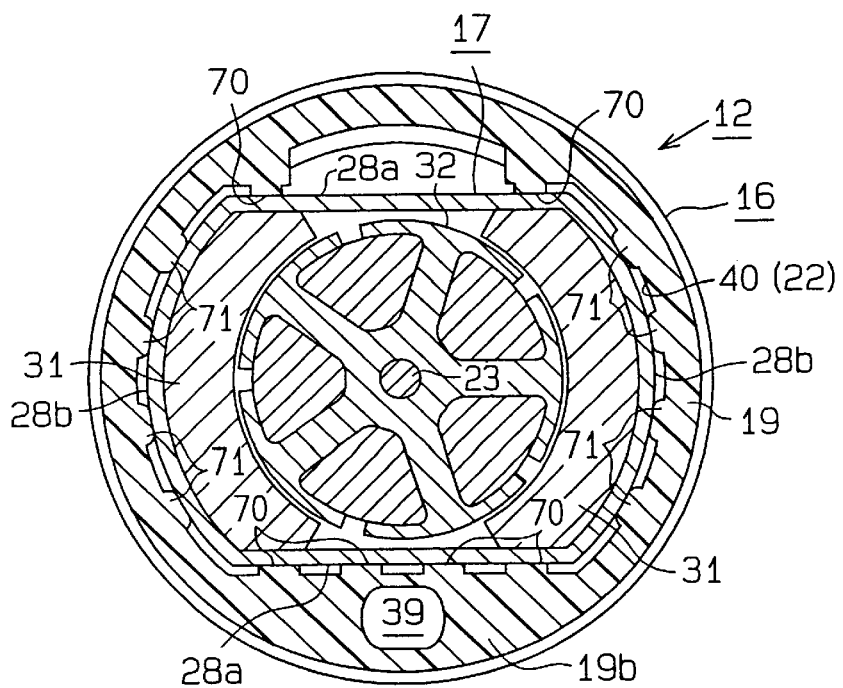
FIG. 10(b) is a cross sectional view showing the housing of FIG. 10(a) accommodating a motor.
Figure 11:
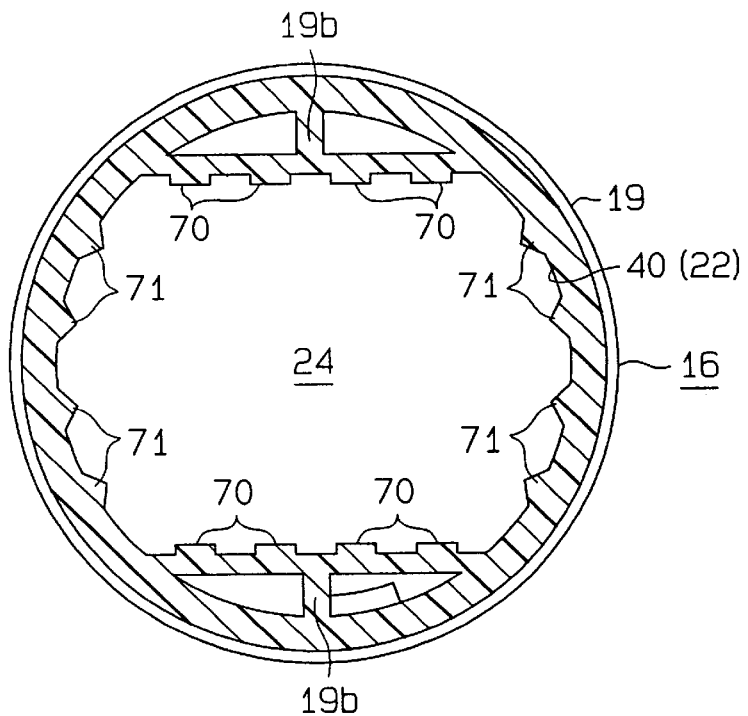
FIG. 11(a) is a cross sectional view taken along line 11a—11a of FIG. 13 showing a housing before installation of a motor in a further embodiment of the present embodiment.
FIG. 11(b) is a cross sectional view of the housing of FIG. 11(a) accommodating a motor.
Figure 11:
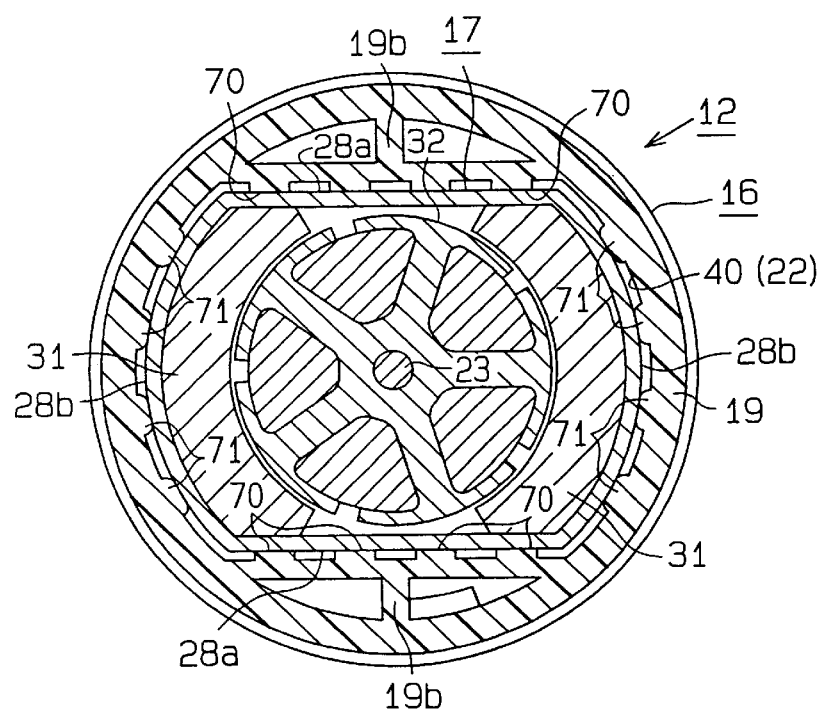

As shown in FIG. 10(b), when the motor 17 is accommodated in the body 19, the flat walls 28a of the motor 17 are retained by the first projections 70, and the arcuate walls 28b of the motor 17 are retained by the second projections 71. The pointed distal end of each second projection 71 absorbs force by deforming when a force is applied to it.

The distance between the upper first projections 70 and the lower first projections 70 is determined such that the flat walls 28a of the motor 17 are tightly held. The diameter of an imaginary circle that touches the distal ends of the second projections 71 is slightly smaller than the diameter of the imaginary circle defined by the arcuate walls 28b, or an imaginary circle circumscribing the motor 17.

If the impeller 27, which is coupled to the output shaft 23 of the motor 17, is offset from the center of the pump chamber 25, cleaning liquid is not effectively pumped. Therefore, the motor 17 must be installed to the housing 16 such that the output shaft 23 is coaxial with the pump chamber 25.

Therefore, the motor 17, when installed in the housing 16 as shown in FIG. 10(b), is moved relative to the housing 16 in a direction parallel to the flat walls 28a such that the output shaft 23 is coaxial with the pump chamber 25. At this time, forces from the arcuate walls 28b are applied to the second projections 71. Since the second projections 71 can be deformed when a force is applied, the motor can move in a direction parallel to the flat walls 28a. On the other hand, the flat walls 28a are tightly retained by the first projections 70, which prevents the motor 17 from moving relative to the housing 16 after the axes coincide.

If the second projections 71 receive forces from the arcuate walls 28b while the axes coincide, the deformation of the second projections 71 absorbs the forces. Accordingly, the arcuate walls 28b do not receive excessive reaction forces from the second projections 71. Therefore, the arcuate walls 28b are not deformed while the axes coincide. This prevents the clearance between the magnets 31 and the armature 32 from varying. Therefore, malfunctions of the motor 17 due to changes in the clearance between the magnets 31 and the armature 32 are prevented.

When the axes coincide, the second projections 71 are not separated from the arcuate walls 28b although the second projections 71 are deformed. That is, the second projections 71 prevent the motor 17 from moving relative to the housing 16 by forces that are smaller than those of the first projections 70. The deformable second projections 71 facilitate inserting the motor into the housing 16.

A further embodiment of the present invention will now be described with reference to FIGS. 11(a)–13. Members similar to those of the embodiments shown in FIGS. 1–10b have the same reference numbers, and the description will focus on differences from the embodiments of FIGS. 1–10(b).

Figure 12:
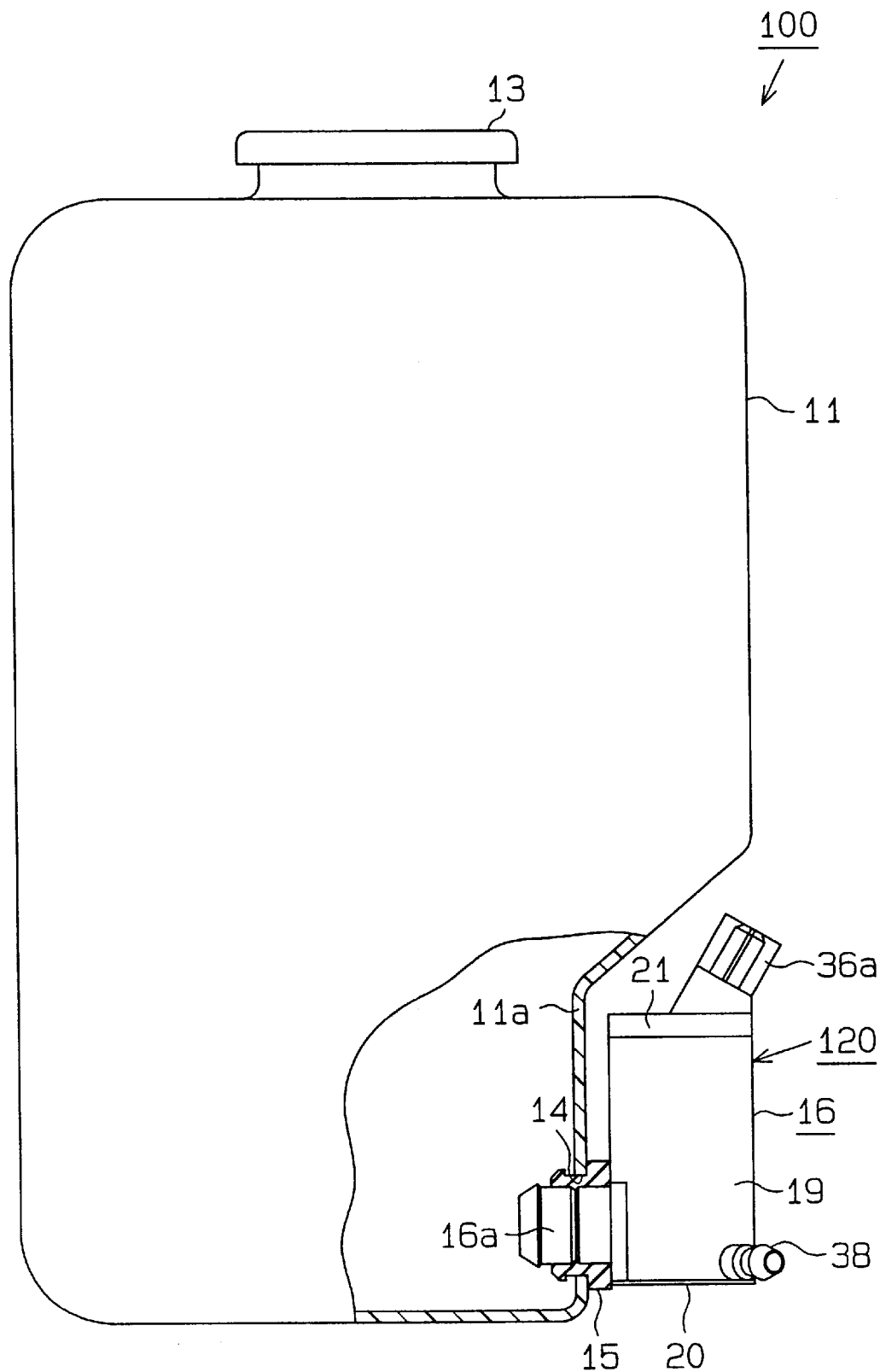
FIG. 12 is a partially cut away front view showing a wash device.
Figure 13:
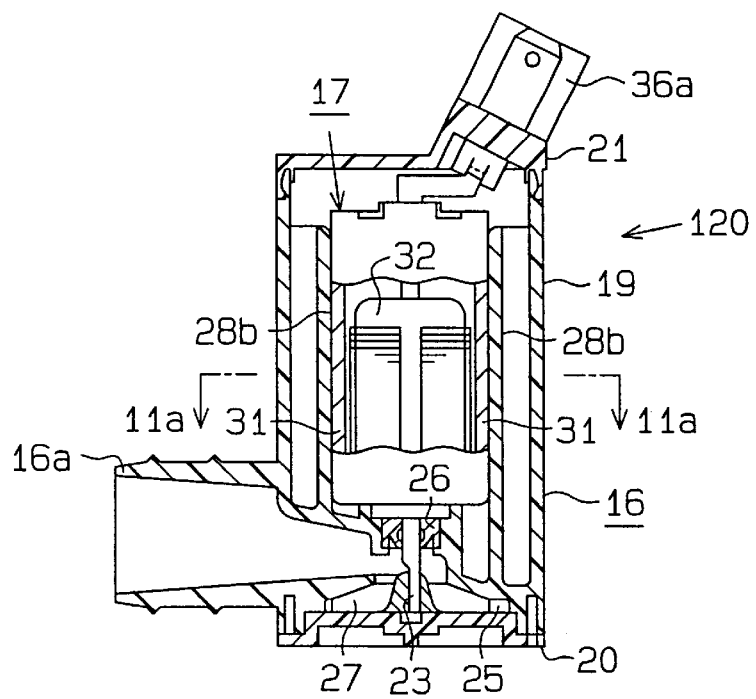
FIG. 13 is a cross sectional view of a washer pump of the washer device of FIG. 12.

As shown in FIGS. 12 and 13, a washer device 100 of the present embodiment is different from the washer device 10 shown in FIG. 2 in that the axis of the washer pump 120 extends in a vertical direction when installed to the tank 11. The housing 16 of the washer pump 120 includes an inlet pipe 16a, which is fitted in the tank 11. When the motor 17 rotates the impeller 27, cleaning liquid is drawn to the pump chamber 25 through the inlet pipe 16a and is pumped to a washer nozzle (not shown) through an outlet 38. The washer pump 120, as shown in FIG. 13, does not have a discharge passage 39 like the washer pump 12 shown in FIG. 1.

FIG. 11(a) is a cross-sectional view of the body 19 of the housing 16 before the motor 17 is installed. FIG. 11(b) is a cross-sectional view of the body 19 after the motor 17 is installed. As shown by the figures, like the embodiment shown in FIGS. 10(a) and 10(b), the first projections 70 are provided on the fitting surface 40 of the body 19 to correspond to the flat walls 28a of the motor 17. Also, the second projections 71 are located on the fitting surface 40 to oppose the arcuate walls 28b of the motor 17. The only difference from the embodiment shown in FIGS. 10(a) and 10(b) is that the upper first projections 70 are symmetrical to the lower first projections 70. The upper and lower thick portions 19b are hollow.

The illustrated embodiment shown in FIGS. 11(a)–13 has the same advantages as those of the embodiment shown in FIGS. 10(a) and 10(b).

Each embodiment shown in FIGS. 10(a)–13 can be varied as follows.

Figure 14:
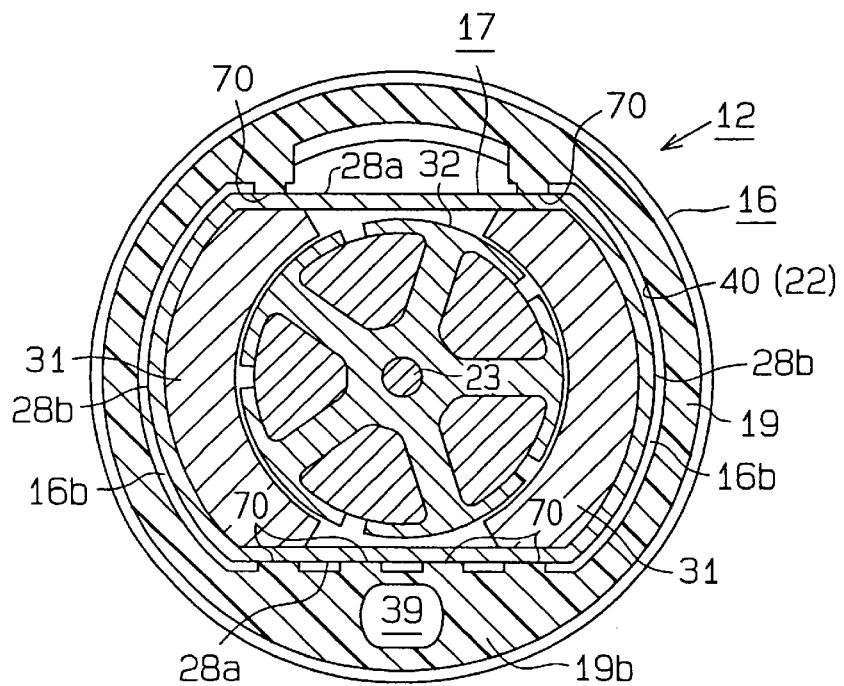
FIG. 14 is a cross sectional view of a washer pump according to a further embodiment of the present invention.

The housing 16 of FIG. 14 is different from that shown in FIGS. 10(a) and 10(b) in that the second projections 71 are omitted. Accordingly, clearances 16b are formed between the housing 16 and the arcuate walls of the motor 17. The clearances 16b permit the motor 17 to move in a direction parallel to the flat walls 28a. The clearances 16b also prevent forces from being applied to the arcuate walls 28b from the housing 16. This prevents the clearance between the magnets 31 and the armature 32 from changing. Since the flat walls 28a are tightly retained by the first projections 70, the motor 17 does not move relative to the housing 16 after the axes coincide. Accordingly, the embodiment of FIG. 14 also has generally the same advantages as those of the embodiment shown in FIGS. 10(a) and 10(b).

The second projections 71 may be omitted from the housing shown in FIGS. 11(a) and 11(b).

Figure 15:
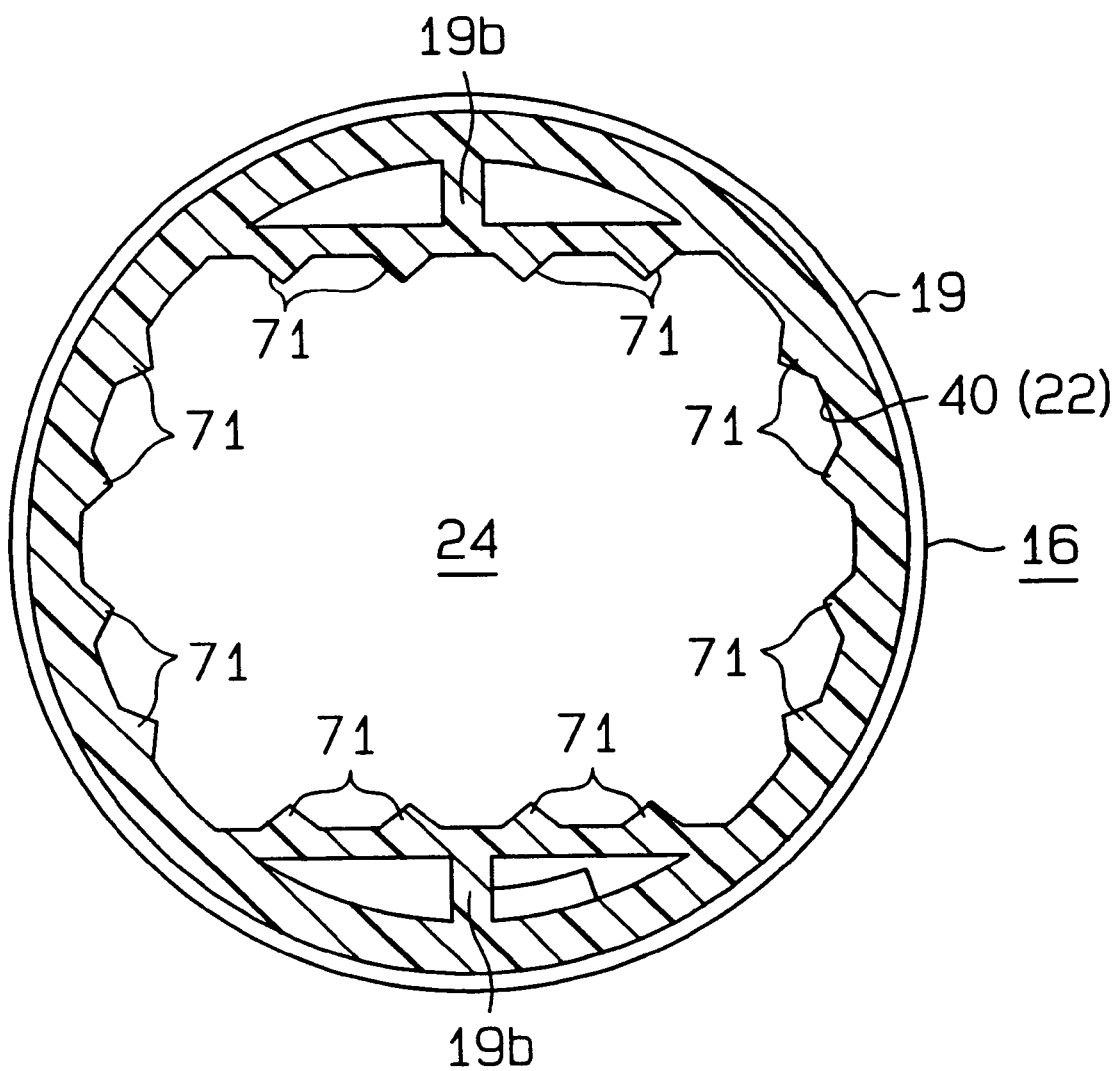
FIG. 15 is a cross sectional view of a housing of a was pump according to a further embodiment the present invention.

The embodiment of FIG. 15 is different from that shown in FIGS. 11(a) and 11(b) in that the second projections 71 are formed instead of the first projections 70. In this case, the motor 17 can move in the housing not only in a direction parallel to the flat walls 28a but in a direction perpendicular to the flat walls 28a. In this way, the axes coincide more accurately.

The first projections 70 shown in FIGS. 10(a) and 10(b) may also be changed to the second projections 71.

Instead of the second projections 71, an elastic member such as rubber may be attached to all or part of the internal surface of the body 19 opposed to the arcuate walls 28b of the motor 17. The elastic member permits the motor 17 to move in a direction parallel to the flat walls 28a.

The first projections 70 may be omitted and the flat walls 28a may be retained by the entire internal surface of the body 19 that is opposed to the flat walls 28a.

The number and size of the projections 71, 70 may be changed as required.

The cross-sectional shape of each second projection 71 is not necessarily triangular. The distal ends may have a flat surface. Also, each of the first and second projections 70, 71 may be different.

The second projections 71 may be formed on one side of the body 19 instead of the two opposed sides.

The present examples and embodiments are to be considered as illustrative and not restrictive and the invention is not to be limited to the details given herein, but may be modified within the scope and equivalence of the appended claims.

What is claimed is:

1. A pump comprising:
   a housing, which includes a motor chamber, wherein the housing includes a drain structure for connecting the motor chamber to the exterior of the housing, wherein the drain structure is arranged to guide a liquid from the motor chamber to the exterior of the housing, and wherein the drain structure includes passages that extend in at least two different directions;
   an impeller, which draws in and pumps out a liquid; and
   a motor, which is accommodated in the motor chamber to drive the impeller, the motor including:
      a case, which has a flat wall located inward of an imaginary circle circumscribing the case, wherein the drain structure is radially aligned with the flat wall such that at least part of the drain structure is located inward of the imaginary circle;
      an output shaft, which is coupled to the impeller;
      a commutator, which is located on the output shaft;
      a brush, which is opposed to the commutator;
      a resilient member, which urges the brush toward the commutator such that the brush contacts the commutator, wherein the resilient member includes a fixed portion supported by the case and a resilient arm portion to which the brush is fixed, wherein the resilient arm portion extends from the fixed portion such that the resilient arm portion is substantially perpendicular to the output shaft and is substantially parallel to the flat wall; and an input terminal, which is attached to the case to supply the brush with external electricity, wherein the input terminal is located between the fixed portion and the commutator.

2. The pump according to claim 1, wherein the housing includes a discharge passage through which a liquid from the impeller flows, wherein the discharge passage is radially aligned with the flat wall such that at least part of the discharge passage is located inward of the imaginary circle.

3. The pump according to claim 1, wherein the motor in the motor chamber is retained by the housing such that the motor is movable in a direction perpendicular to an axis of the output shaft.

4. The pump according to claim 3, wherein the housing permits the motor to move at least in a direction parallel to the flat wall.

5. The pump according to claim 4, wherein the case has a maximum diameter portion that defines the imaginary circle, wherein a retainer is formed on an internal surface of the housing and is opposed to the maximum diameter portion, wherein the retainer contacts and retains the maximum diameter portion, and wherein the retainer is deformed when a force is applied from the maximum diameter portion to the retainer.

6. The pump according to claim 5, wherein the retainer is a projection that radially projects from the internal surface of the housing.

7. The pump according to claim 4, wherein the case has a maximum diameter portion that defines the imaginary circle, wherein a clearance is formed between the maximum diameter portion and the housing to permit the motor to move in the direction parallel to the flat wall.

8. The pump according to claim 4, wherein a retainer for firmly retaining the flat wall is formed on an internal surface of the housing and is opposed to the flat wall.

9. A pump comprising:

a housing, which includes a motor chamber, wherein the housing includes a drain structure for connecting the motor chamber to the exterior of the housing, wherein the drain structure is arranged to guide a liquid from the motor chamber to the exterior of the housing, and wherein the drain structure includes passages that extend in at least two different directions;

an impeller, which draws in and pumps out liquid; and a motor, which is accommodated in the motor chamber to drive the impeller, the motor including:

a case, which has a flat wall located inward of an imaginary circle circumscribing the case, wherein the drain structure is radially aligned with the flat wall such that at least part of the drain structure is located inward of the imaginary circle, and wherein the case includes a tubular yoke having an open end and a conductive support member attached to the open end to be electrically connected to the yoke;

a magnet accommodated in the yoke, wherein the support member includes a positioning member for determining the position of the magnet when the support member is attached to the yoke;

an output shaft, which is coupled to the impeller;

a commutator, which is located on the output shaft;

a brush, which is opposed to the commutator; and a resilient member, which urges the brush toward the commutator such that the brush contacts the commutator, wherein the resilient member includes a fixed portion supported by the case and a resilient arm portion to which the brush is fixed, wherein the resilient arm portion extends from the fixed portion such that the resilient arm portion is substantially perpendicular to the output shaft and is substantially parallel to the flat wall, wherein the resilient member is insulated from and is supported by the support member.

10. A pump comprising:

a housing, which includes a motor chamber, wherein the housing includes a drain structure for connecting the motor chamber to the exterior of the housing, wherein the drain structure is arranged to guide a liquid from the motor chamber to the exterior of the housing, and wherein the drain structure includes passages that extend in at least two different directions;

an impeller, which draws in and pumps out a liquid; and a motor, which is accommodated in the motor chamber to drive the impeller, the motor including:

a case, which has a flat wall located inward of an imaginary circle circumscribing the case, wherein the drain structure is radially aligned with the flat wall such that at least part of the drain structure is located inward of the imaginary circle;

an output shaft, which is coupled to the impeller;

a commutator, which is located on the output shaft;

a brush, which is opposed to the commutator;

a resilient member, which urges the brush toward the commutator such that the brush contacts the commutator, wherein the resilient member includes a fixed portion supported by the case and a resilient arm portion to which the brush is fixed, wherein the resilient arm portion extends from the fixed portion such that the resilient arm portion is substantially perpendicular to the output shaft and is substantially parallel to the flat wall.

* * * * *